US008250790B2

(12) United States Patent
Wong

(10) Patent No.: US 8,250,790 B2
(45) Date of Patent: Aug. 28, 2012

(54) PRINTING PRODUCT THAT MAY REVOLVE AND ILLUMINATE TO FORM A 3-D VISION

(76) Inventor: KiKin Wong, Dongguan (CN)

( * ) Notice: Subject to any disclaimer, the term of this patent is extended or adjusted under 35 U.S.C. 154(b) by 217 days.

(21) Appl. No.: 12/384,485

(22) Filed: Apr. 6, 2009

(65) Prior Publication Data

US 2009/0241387 A1 Oct. 1, 2009

(51) Int. Cl.
*G06F 1/00* (2006.01)

(52) U.S. Cl. ..................... 40/124.02; 40/124.08; 40/463

(58) Field of Classification Search ................. 40/124.2, 40/124.08, 463, 466, 473
See application file for complete search history.

(56) References Cited

U.S. PATENT DOCUMENTS 3,061,971 A * 11/1962 Fites ............................ 446/150
3,381,399 A * 5/1968 Drueck, Jr. ...................... 40/473
4,070,973 A * 1/1978 Morgan .......................... 108/20
4,490,932 A * 1/1985 McIntire ......................... 40/473
2005/0055855 A1* 3/2005 Vernon-Dier ................... 40/431
2008/0229674 A1* 9/2008 Dunham .......................... 52/28
2009/0126239 A1* 5/2009 Clegg ......................... 40/124.03

FOREIGN PATENT DOCUMENTS

CN 94228968.4 1/1996
CN 1785686 A 6/2006

* cited by examiner

*Primary Examiner* — Casandra Davis

(57) ABSTRACT

A printing product that may revolve and illuminate to form a 3-D vision comprises a main body (1), a revolver (2) arranged on the main body, a circuit device (3) for driving the revolver to rotate, and a trigger switch (4) for controlling disconnection or connection of the circuit device. The circuit device drives the revolver to rotate via a motor (31). The revolver is located in a segmental orifice (10) provided in the main body. A set of luminous elements (20) connecting with the circuit device is arranged on the revolver. The present invention provides an electrical driving apparatus for a greeting card, a book and so on. The revolver is made rotate by the electrical driving apparatus, thus forming a 3-D vision when the luminous elements on the revolver are rotating. Furthermore, the revolver of the present invention is arranged in the horizontal direction, and a rotating space is left for the revolver beforehand by providing the segmental orifice in the main body. Therefore, the space occupied by the printing product will not be increased and the revolver will form a 3-D vision, so an interest of the product may be greatly enhanced.

1 Claim, 4 Drawing Sheets

PRINTING PRODUCT THAT MAY REVOLVE AND ILLUMINATE TO FORM A 3-D VISION

FIELD OF THE INVENTION

The present invention relates to the technical field of books, greeting cards and other printed matter, particularly referring to a printing product that may revolve and illuminate to form a 3-D vision

BACKGROUND OF THE INVENTION

Ordinary printed matter only has text, design and other images. They are designed via printing technology. Even though it is delicately printed, it can only improve the static beauty of the product. As to this, someone designs this kind of printed matter with light display and music (like music greeting cards, recorded books and so on).

As described in Chinese patent application No: 200410089386.4 (publish No: CN 1785686 A), entitled "Flashing mode luminous electron congratulation card", issued on 14 Jun. 2006, which the abstract thereof is translated into English as follow:

"An electronic greeting card that illuminates in flickering fashion comprises a card, a luminous circuit board and at least one set of light emitting diodes. Said greeting card further includes a light guiding plate, which a groove is set therein to accommodate said circuit board. Said light emitting diodes are incorporated into said light guiding plate and connected electrically to the circuit board. A backlit film having figures or letters is engaged with said greeting card, to cover said light guiding plate; said light emitting diodes are arranged to correspond with figures or letters of said backlit film. The luminous circuit board is equipped with a battery and a switch. After connected to the power, the light emitting diode on the circuit is controlled by a WP-S type integrate circuit and illuminates driven by two dynatrons, which make the design and text illuminate rhythmically and give people a totally new feeling different from the existing greeting cards."

As described in another Chinese patent No: 94228968.4, entitled "Sound-illustrated bound book", which the abstract thereof is translated in to English as follow:

"A sound-illustrated bound book comprises a shell and a shell base. The shell is equipped with a filmy keystroke and vocal hole. Thus, when seeing one picture or text, press the corresponding key and then it can voice the instructions of the picture or text. Both the voice and texts are excellent."

In addition, the sense of the images on the retina will not immediately disappear after the visual stimulus of the vision on the outside object stops. Usually it will last for about 1/12 to 1/16 seconds, and this is called visual afterimage. The cause of phenomenon is the trace effect left by nerve excitement, also called visual photogene. For instance, the fireworks in the night, we can see the continuous shining line of various kinds. As a matter of fact, the fireworks is just a light spot at any second and any position, while because of the characteristic of visual photogene, the fore-and-aft light spot forms a line on the retina. The light of television and fluorescent lamp is virtually twinkling. However because of the effect of visual afterimage, it can not be seen by naked eyes since its twinkling frequency is quite high, which is about 100 times per second or more. Movie technology is invented by using this principle. When a series of separate action move at the speed of 16 images per second or more on the movie film, people will feel it is a sequential action on the screen. The modern cartoon is also made by above principle, separating and drawing the actions into separate action, and playing them continuously, as a result it becomes sequential action. According to this, a light display device is designed, such as America patent, the patent number of which is U.S. Pat. No. 6,037,876. It claims a fan that can produce lighting information. The given embodiment is to arrange a row of luminescent lamps on the fan blade of the ceiling fan. These luminescent lamps also adopt program control system to output the specified order and control the lighting time. In this way, it can display some information pictures when the fan rotates.

As mentioned above, adding rotating image device on the greeting card and book is the new product that many producers are developing. But as the printed product is very thin, the revolving solid can only rotate on the plane where the product itself is, and the thickness of the revolving solid itself also should be thinly designed. Otherwise the printed matter could not hold the revolving solid, or enlarge the volume of the printed matter in order to hold the revolving solid. While even though the revolving solid is set on the printed matter by said method, the image if forms through rotating is still an ichnography, which can not achieve tridimensional image effect.

SUMMARY OF THE INVENTION

The technical problem that this invention needs to solve is to combine the present technique and provide a printing product that may revolve and illuminate to form a 3-D vision.

To solve the foresaid technical problem, this invention adopts the following technical proposal: this printed matter includes main body of the printed matter, revolving solid set on the main body, circuit device driving the revolving solid and triggered switch which controls on and off of the circuit device. The circuit device drives the revolving solid through motor. A hole is set on the said main body, in which the revolving solid is put, and a group of illuminants connected to the circuit device is placed on the revolving solid. In this invention, the revolving solid can be driven by the circuit device. When the revolving solid rotates around the hole, the illuminant on it will rotate with it and form a tridimensional image.

The rotating direction of the said revolving solid is perpendicular to the plane where the main body is. In this way, the revolving solid can be placed on the same plane with main body 1, reducing the bulk of the product and leaving a revolving room for the revolving solid by the hole opened on the main body.

Said revolving solid includes principal axis connected to the output rotating axis of the motor and several side axes which symmetrically installed on the two sides of the principal axis. Several ladderlike placed illuminants are arranged on the principal axis and the side axes at different height. The illuminants at different axial height separately form image when rotating, and create a tridimensional image.

Further more, said circuit device comprises motor, power supply, loudspeaker, circuit board and illuminant which are connected by lead. The loudspeaker can produce music, while the light produced by the revolving solid can ornament the entire product, which increase the interest and sense of beauty of the product.

Said triggered switch can adopt automatic trigger structure similar to the present electronic music card. It includes an insulated connecting rod, one end of which is interlocked with the main body, and a hole is opened on its end. This end is inserted between an elastic contacting tablet in the loop of the circuit device and its contact. The connecting rod lets the hole drop into or deviate from the position between the contacting tablet and its contact driven by the main body.

The motor, power supply, loudspeaker, and the circuit board in the said circuit device are fixed in the interlayer of the main body. The principal axis of the revolving solid extends into the interlayer and is interlocked with the output rotating axis of the motor, so that it will not affect the whole aesthetic feeling.

The principal axis and the side axes of the said revolving solid are on the same plane. Then the revolving solid can be flatly placed and put in the main body when folding the main body. In this way, it reduces the room the product takes up.

This invention installs electric device into ordinary greeting cards and books, making the illuminant form tridimensional image when it rotates through driving the revolving solid by electric device. Meanwhile the revolving solid in this invention is horizontally placed, and a rotating room is left for it by opening a hole on the main body. In this case, the product will not take up much room and the revolving solid can form tridimensional image as well, which tremendously increases the interest of the product.

BRIEF DESCRIPTION OF THE DRAWINGS

The following further illustrates this invention combing the attached drawing:

Picture 1 is the front view in this invention;

Picture 2 is the inner circuit view in this invention;

Picture 3 is the diagrammatic drawing of tridimensional image formed when the revolving solid in this invention rotates;

Picture 4 is the front view of the second exploit example in this invention;

Picture 5 is the diagrammatic drawing of the third exploit example in this invention;

Picture 6 is another diagrammatic drawing of the revolving solid in this invention.

DETAILED DESCRIPTION OF THE EMBODIMENTS

Figure 1:
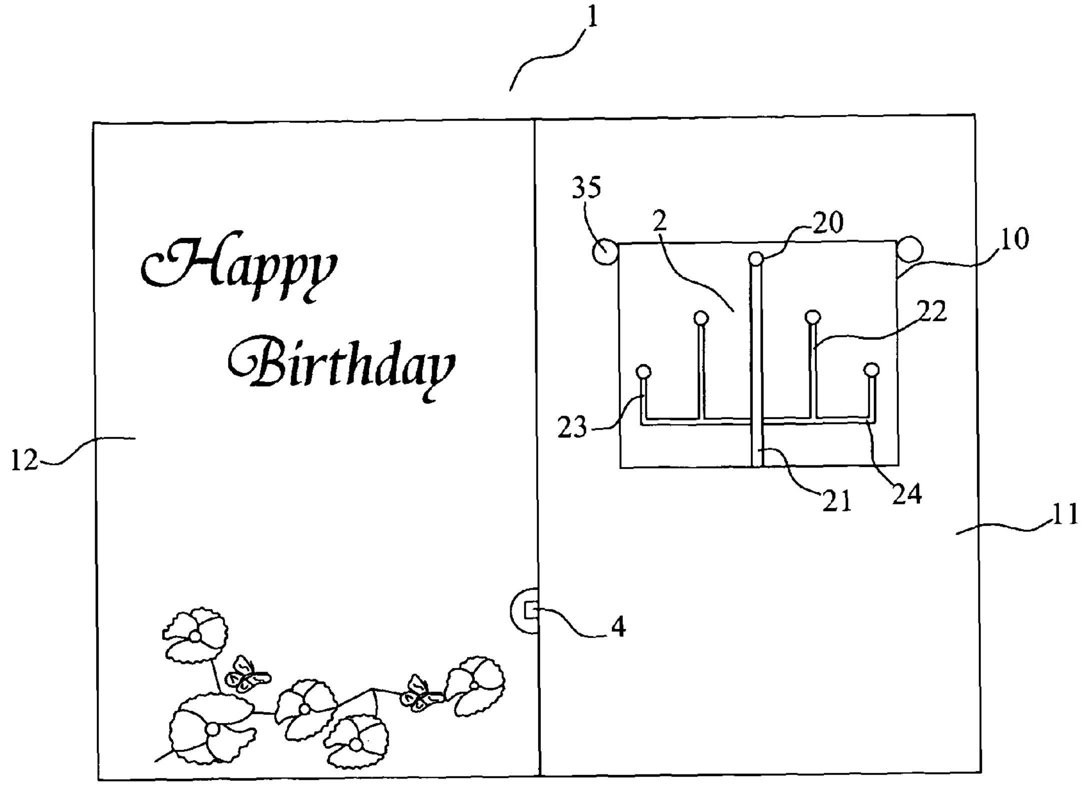
Figure 2:
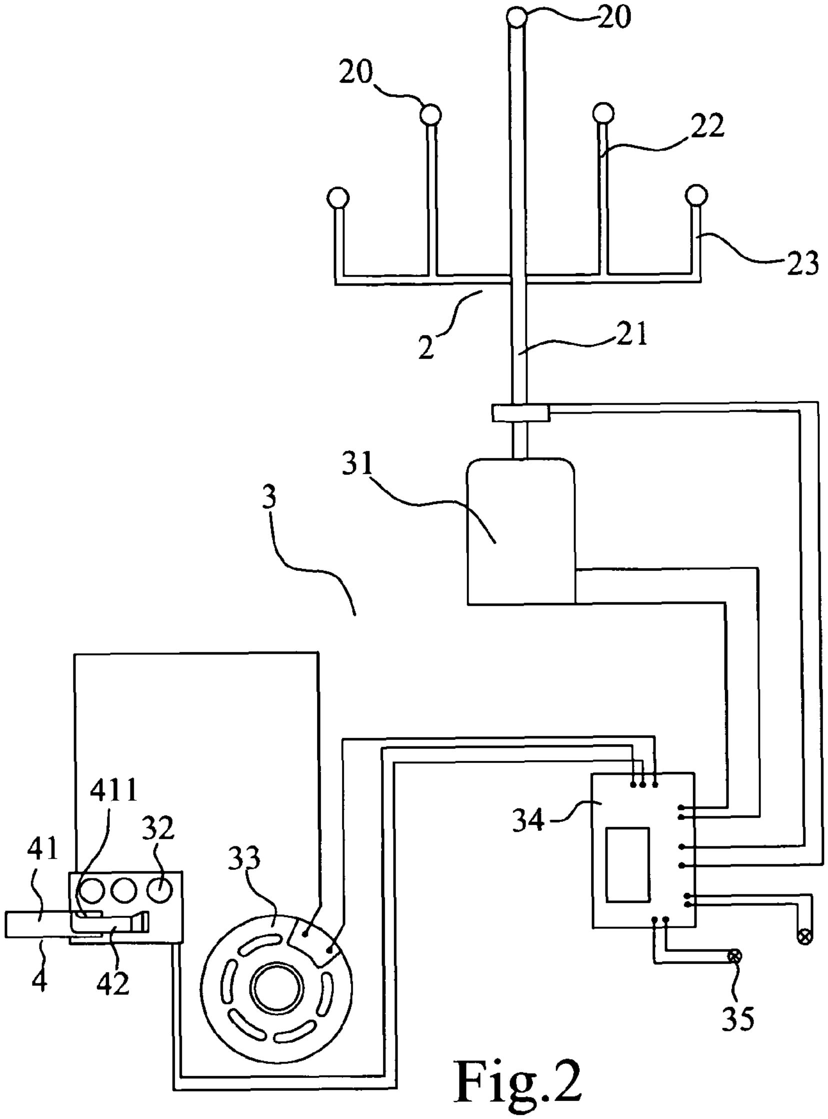
Figure 3:
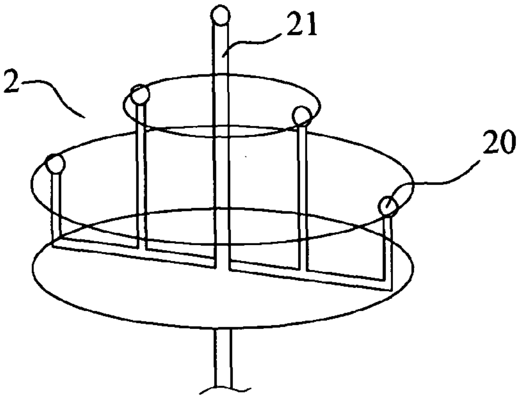

As illustrating in FIGS. 1~3, this is the exploit example of this invention applied to greeting card. It includes main body 1 of printed matter (this exploit example is greeting card), revolving solid 2, circuit device 3, triggered switch 4 and illuminant 35, 21. The main body 1 can be folded with two folding surfaces 11, 12, in which folding surface 11 is interlayer, so the circuit device 3 can be arranged in this interlayer. By this, circuit device 3 is hidden, which does not affect the beauty of the product. The triggered switch 4 forms connect through on and off of main body so as to switch on and off the circuit device.

The circuit device 3 includes motor 31, power supply 32, loudspeaker 33, circuit board 34 and illuminant 35. These elements are connected through lead, forming a loop. This element is fixed in the interlayer formed by main body.

A hole 10 is opened on the folding surface of the main body 1, and it leaves room for the revolving solid to rotate, so that the revolving solid 2 can rotate normally. The revolving solid 2 is in this hole 10, including a principal axis 21 which is connected to the output rotating axis of motor 31 and several side axes 22, 23 symmetrically placed on both sides of principal axis 21. The principal axis 21 and the side axes 22, 23 are ladderlikely placed, namely the length of axis from the principal axis 21 to the external side axis 23 is gradually shortened. The principal axis 21 of the revolving solid 2 and the side axes are on the same plane. Therefore the revolving solid can be flatly placed (on the same plane with the folding surface 11 of main body 1) when folding the main body 1. In this way, it can reduce the room taken by the product. Several ladderlike placed illuminants 20 are arranged on the principal axis and the side axes at different height. The illuminants 20 at different axial height separately form image when rotating, and create a tridimensional image. The end of principal axis 21 extends into the interlayer of the folding surface, and links to the output rotating axis of motor 31.

There are several through holes on the main body 1 corresponding to each illuminant 35 in the circuit device 3, to display the light produced by illuminant 35 before the user. Meanwhile various designs can be drawn on the surface, making the product much more gorgeous and interesting together with the light produced by illuminant 35.

The triggered switch 4 in this invention has an insulated connecting rod 41, one end of which is attached to one folding surface 12 of main body 1 (the page which does not install circuit device) and the end of it has a hole 411. The end of this connecting rod 41 is between an elastic contacting tablet 42 in the circuit device 3 and its contact. After the main body 1 is opened, the connecting rod 41 moves with the overture of the folding surface of main body 1.

The hole 411 of its end is right on the place where the contacting tablet 42 and its contact join. Because of the hole 411, the contacting tablet 42 will come into contact with its contact. The circuit of the whole circuit device 3 is switched on and begins to operate. On the contrary, when the main body 1 is shut, the connecting rod 41 moves with the overturn of the folding surface 12 of the main body 1. The hole 411 of its end deviates from the position where the contacting tablet 42 and its contact join and they are separated by the connecting rod 411, as a result, the circuit of the whole circuit device 3 is cut off and stops working. In this case, automatically turning on and off the product can be achieved by this triggered switch 4.

Said triggered switch 4 is only a specific exploit example of this invention. It can also use other structure, such as using contact switch directly.

The reason why the revolving solid 2 of this invention adopts the said structure is to form a ladderlike tridimensional image in the process of its rotation. See picture 3. when the revolving solid 2 is driven to rotate by the motor, the illuminant 20 at the different height can create a ladderlike tridimensional image after rotating because the principal axis 21 and the side axes 22, 23 are ladderlikely placed. The image is like a birthday cake which is very interesting.

Using this invention, when the main body 1 is opened, the triggered switch 4 is pulled during the opening process of main body 1. The power supply of circuit device 3 is connected and the whole circuit is in a closed state while the illuminant 35 and the motor 31 begins to operate. At this time, the music in the circuit board 34 will be played through the loudspeaker 33. Meanwhile the motor 31 starts rotating and the revolving solid 2 is driven to rotate by the motor 32 through principal axis 21. The illuminant 20 on the revolving solid 2 is also connected to the power supply 32 through the lead set in the principal axis 21. Thus the illuminant 21 is enlightened. After the revolving solid 2 begins rotating, people will see the continuous and stable light because of the visual afterimage principle. The whole revolving solid 2 will be shaped like an interesting birthday cake, which could be a big surprise for the one who receives the card.

Figure 4:
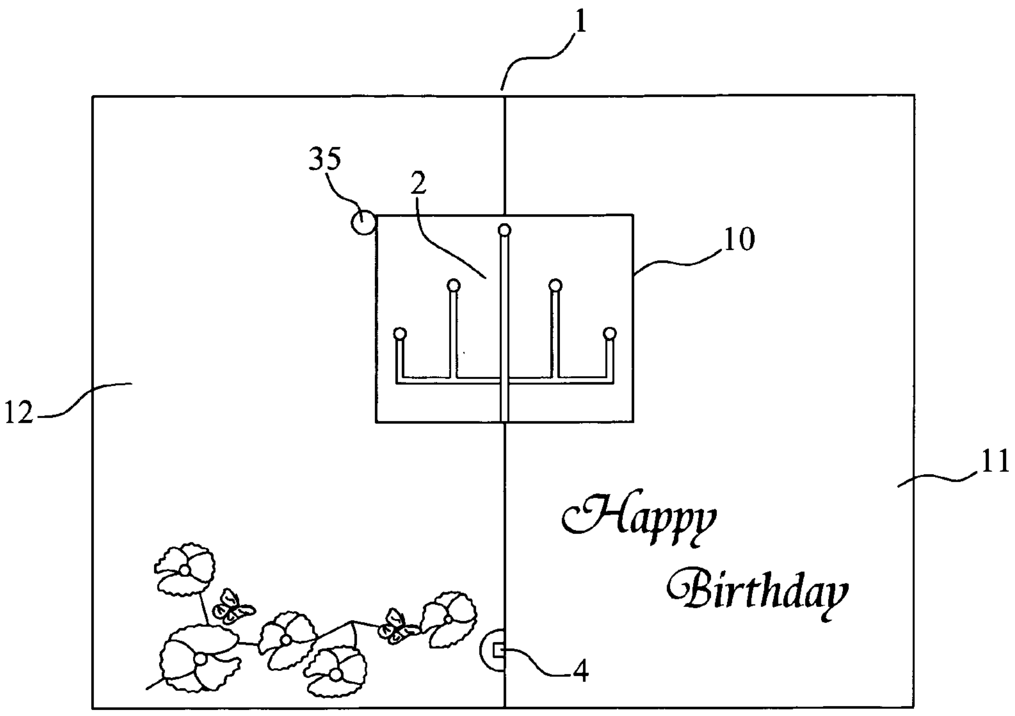
Figure 5:
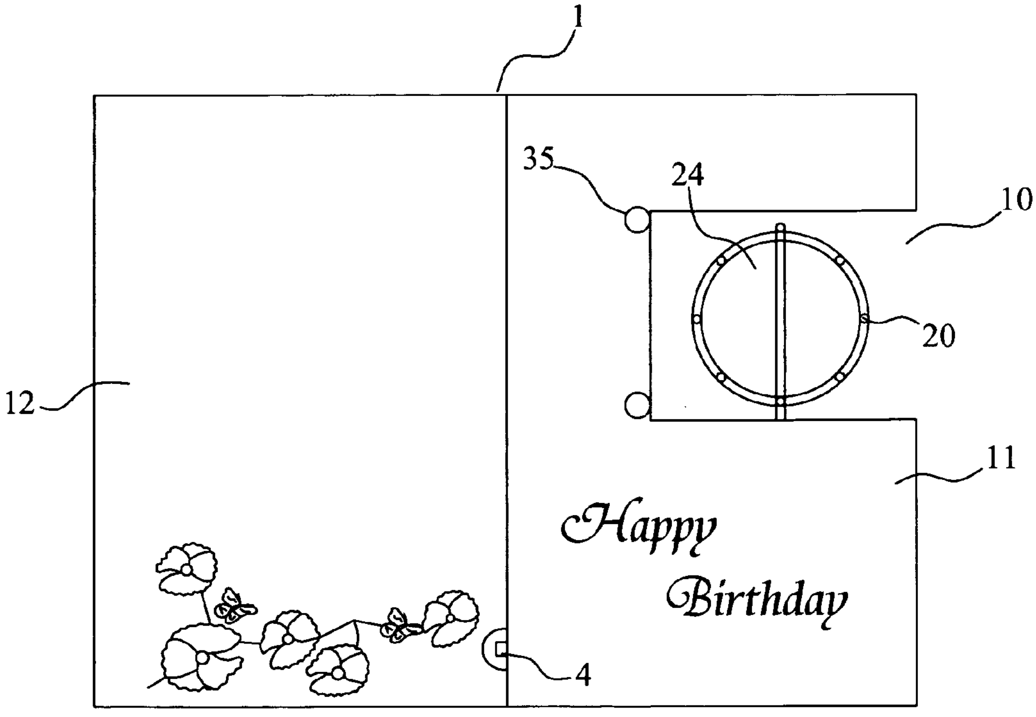
Figure 6:
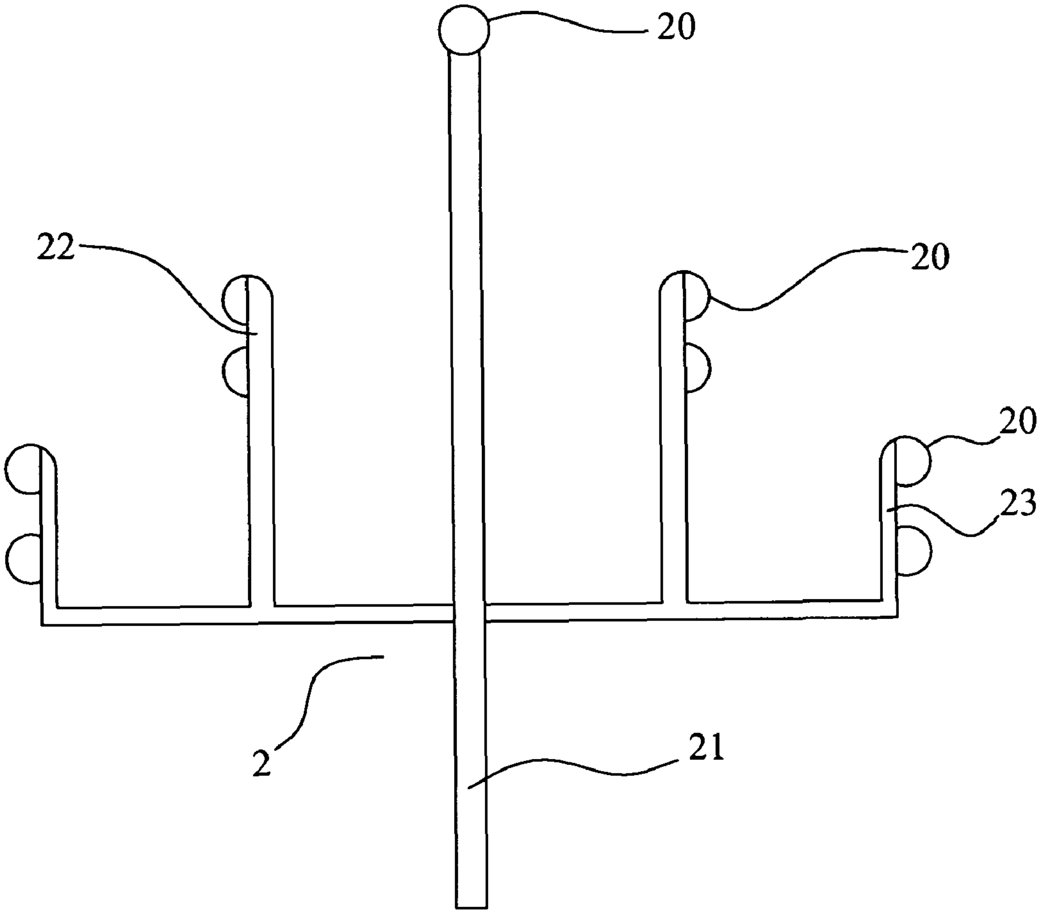

As shown in FIG. 4, the difference between this exploit example and the foresaid exploit example is that the hole 10 on the main body 1 is not opened on the folding surface 11, but opened on the combined position between the folding surfaces 11, 12. Absolutely it can be opened at different places according to different demands.

Besides, the revolving solid in this invention can be designed into different models according to demands so as to form different tridimensional image. See picture 5, the main body of the revolving solid in this exploit example is a circle. The illuminant 20 is arranged at the different position with the circle. In this way, it can create a luminous sphere when it rotates.

The position of the illuminant 20 on the revolving solid 2 is not fixed, seeing picture 6. Compared with the foresaid exploit example, the illuminant in this exploit example is outside the side axes 22, 23.

Certainly, what is described above is just the example of this invention, but not limiting to the scope of this invention. For instance, the greeting card in the said exploit example can also be replaced as book, notebook and other similar printed matter. So all the changes and decorations based on said structure, characteristic and principle of this invention belongs to the patent scope of this invention.

What is claim claimed:

1. A printing product that revolves and illuminates to form a 3-D vision, comprising a main body (1) which is a planar card, a hole extending through the main body, a revolving solid (2) set within the hole of the main body (1), a circuit device (3) rotating the revolving solid (2) and an on/off triggered switch (4) which controls the circuit device (3); Said circuit device (3) further comprising a motor (31) for rotating the revolving solid (2);

the revolving solid (2) comprises a principal axis (21), side axes (22-23) which are symmetrically installed on two sides of said principal axis (21), and plurality of illuminants (20) connected to the circuit device, wherein the a principal axis (21) is connected to an output rotating axis of the motor (31) and wherein said illuminants (20) are arranged on the principal axis (21) and the side axes (22-23) at different height;

Said principal axis and sides axes lie in the same plane; and

Said circuit device (3) comprise the motor (31), a power supply (32), a loudspeaker (33), a circuit board (34) and an illuminating element (35) which are connected through a lead;

Said triggered switch (4) has an insulated connecting rod (41), one end of which is interlocked with the main body (1), and a hole (411) is opened on its opposite end; said opposite end is inserted between an elastic contacting tablet (42) in a loop of the circuit device (3) and its contact; The connecting rod (41) allows said hole (411) drop into or deviate from a position between the contacting tablet (42) and its contact driven by the main body (1).

* * * * *